Oct. 30, 1923.

H. SMITH

ENDLESS WIRE BELT CONVEYER

Filed June 11, 1923

1,472,252

INVENTOR
Harold Smith

Patented Oct. 30, 1923.

1,472,252

UNITED STATES PATENT OFFICE.

HAROLD SMITH, OF MITCHAM, ENGLAND, ASSIGNOR TO MESSRS. JOSEPH BAKER SONS & PERKINS LIMITED, OF WILLESDEN, MIDDLESEX, ENGLAND.

ENDLESS-WIRE-BELT CONVEYER.

Application filed June 11, 1922. Serial No. 644,535.

*To all whom it may concern:*

Be it known that I, HAROLD SMITH, a subject of the King of England, residing at Mitcham, Surrey, England, have invented certain new and useful Improvements in Endless-Wire-Belt Conveyers (for which I have filed an application in England 4th March, 1922, No. 6469 of 1922), of which the following is a specification.

The present invention relates to wire belt drying conveyers, of the type described in the patent to Gee No. 1,274,158, showing a conveyer belt made up of parallel endless wires passing round two or more rollers having a number of grooves corresponding to the number of wires. The grooves serve to space the wires and each wire is provided with an individual tensioning device, say a spring or weight, acting direct on the wire.

It has been found in practice that owing to the unequal stretching of the wires, which is partly due to unequal heating, the wires have a tendency to sag or slack on what should be the tight side of the belt. The slack wires are prone to run out of their grooves on the rollers and to become entangled. The tensioning arrangement shown in the said patent, is intended to avoid this drawback, but in practice, the weight or spring force required to keep the wires taut is very considerable, and puts a great strain on such wires. According to the present invention, therefore, the idler roller, instead of having a continuous surface, is built up of individual grooved discs, one for each wire, which are mounted upon a common shaft so as to be capable of turning upon such shaft relatively to one another. This arrangement has the advantage that the weight or force required to keep the wires taut is much smaller, as the frictional resistance to be overcome during the adjustment is much smaller. It will be understood that during the adjustment of an individual wire, the idle individual disc upon which the wire is supported at one end can freely revolve upon its shaft for such small part of a turn as is needed to keep the wire taut, whereas in the said patent the wire must be moved by the tensioning device relatively to the groove.

Figure 1:
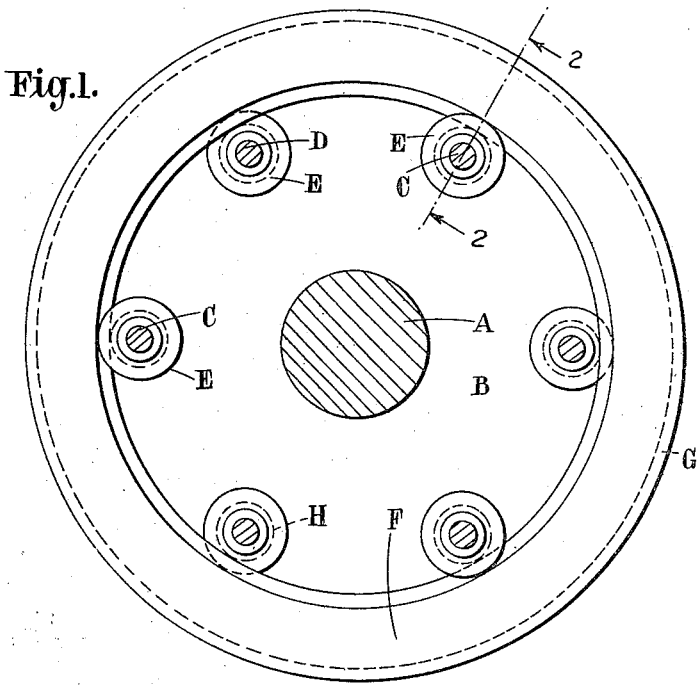
Figure 2:
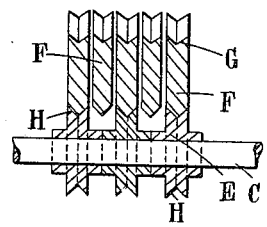
Figure 3:
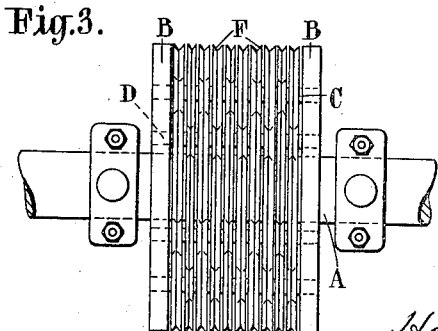

In the accompanying drawing showing diagrammatically an embodiment of the multiple disc roller according to my invention, Fig. 1 is a side view of one of the discs used for the roller, Fig. 2 a section along line 2—2 in Fig. 1, showing adjacent discs, and Fig. 3 an elevation of a complete disc roller.

Each disc carrying a wire is made in the form of a flat ring F the outer periphery of which is grooved as shown at G, the inner periphery being of V-section. These rings F are supported at three or more equidistant points by small steady wheels or rollers E having grooves H. In order to obtain a sufficiently long bearing for the said steady wheels, they are staggered relative to the adjacent rings, and are mounted on long rods D or C, which are secured in the end plates B mounted on the same spindle A, which also constitutes the axis of rotation of the said rings F.

The operation is as follows: The wires which are driven by a pulley (not shown) and each of which is provided with an individual tensioning device as disclosed in the above said patent, rotate the discs or rings F, each disc rolling on three steady wheels E, which are mounted on the rods C or D secured in the end plates B. The latter and the spindle A rotate together, while the movement of the discs F upon the steady wheels E relative to the spindle A is slight only, sufficient to enable each wire to be tensioned separately. The tension adjustment of the wires is automatic, and all the wires move with the same speed, the roller made up of the separate discs F moving with the same peripheral speed as the driving pulley for the wires.

It may be pointed out that the invention is applicable to wire belt conveyers used in the drying of china clay, chocolate coating machines, and other kinds of machines.

I claim:—

1. In an endless wire belt conveyer an idler roller, comprising a plurality of wire carrying rings, and circularly arranged small steady wheels supporting the said rings, the steady wheels of adjacent rings being circumferentially staggered.

2. An idler roller as specified in claim 1, comprising also rods carrying the said steady wheels, and end plates receiving the ends of the said rods.

3. In an endless wire belt conveyer, the combination with a central shaft, of a plurality of individual circumferentially grooved flat rings concentric with the said shaft, circularly disposed small steady wheels supporting the said rings and arranged in sets, the wheels of one set being staggered relative to the wheels of the adjacent set, and rods carrying the said steady wheels.

In testimony whereof I have hereunto set my hand in the presence of two witnesses.

HAROLD SMITH.

Witnesses:
DONALD T. JONES,
HARRY BARNETT.